(12) United States Patent
Melville et al.

(10) Patent No.: US 6,977,631 B2
(45) Date of Patent: Dec. 20, 2005

(54) OPTICAL SCANNING SYSTEM WITH VARIABLE FOCUS LENS

(75) Inventors: Charles D. Melville, Issaquah, WA (US); Michael Tidwell, Seattle, WA (US); Richard S. Johnston, Issaquah, WA (US); Joel S. Kollin, Long Island City, NY (US)

(73) Assignee: University of Washington, Seattle, WA (US)

( * ) Notice: Subject to any disclaimer, the term of this patent is extended or adjusted under 35 U.S.C. 154(b) by 94 days.

(21) Appl. No.: 10/246,020

(22) Filed: Sep. 17, 2002

(65) Prior Publication Data

US 2003/0016187 A1   Jan. 23, 2003

Related U.S. Application Data

(63) Continuation of application No. 09/740,272, filed on Dec. 18, 2000, now Pat. No. 6,492,962, which is a continuation of application No. 09/188,991, filed on Nov. 9, 1998, now Pat. No. 6,191,761.

(51) Int. Cl.[7] ............................................. G09G 3/00
(52) U.S. Cl. .............................. 345/32; 345/7; 359/630
(58) Field of Search .................. 345/32, 7–9; 348/135, 348/140, 350; 359/630, 631, 212–214, 223–224, 359/360, 361; 356/3.16, 4.03, 4.07

(56) References Cited

U.S. PATENT DOCUMENTS

| | | | |
|---|---|---|---|
| 4,191,460 A * | 3/1980 | Fujiki | 396/88 |
| 4,233,503 A * | 11/1980 | Saito | 250/204 |
| 4,584,704 A * | 4/1986 | Ferren | 382/255 |
| 4,733,064 A * | 3/1988 | Ishikawa | 250/201.4 |
| 5,355,181 A * | 10/1994 | Ashizaki et al. | 348/744 |
| 5,498,868 A * | 3/1996 | Nishikawa et al. | 250/234 |
| 5,587,836 A * | 12/1996 | Takahashi et al. | 359/630 |
| 5,596,339 A * | 1/1997 | Furness et al. | 345/8 |
| 5,717,453 A * | 2/1998 | Wohlstadter | 348/46 |
| 5,764,290 A * | 6/1998 | Hirota et al. | 348/240.3 |
| 5,986,793 A * | 11/1999 | Yamaguchi et al. | 359/216 |
| 6,191,761 B1 * | 2/2001 | Melville et al. | 345/32 |
| 6,329,966 B1 * | 12/2001 | Someya et al. | 345/22 |
| 6,492,962 B2 * | 12/2002 | Melville et al. | 345/32 |
| 6,618,091 B1 * | 9/2003 | Tamura | 348/363 |

* cited by examiner

*Primary Examiner*—Regina Liang
*Assistant Examiner*—Jennifer T. Nguyen
(74) *Attorney, Agent, or Firm*—Steven P. Koda

(57) ABSTRACT

Apparent distance of a pixel within an optical field of view is determined. Incoming light is scanned along a raster pattern to direct light for a select pixel onto a light distance detector. The distance is sampled for each pixel or for a group of pixels. The light distance detector includes a concentric set of rings sensors. The larger the spot of light corresponding to the pixel, the more rings are impinged. The diameter of the spot is proportional to the distance at which the light originated (e.g., light source or object from which light was reflected). Alternatively, a variable focus lens (VFL) adjusts focal length for a given pixel to achieve a standard spot size. The distance at which the light originated correlates to the focal length of the VFL.

3 Claims, 3 Drawing Sheets

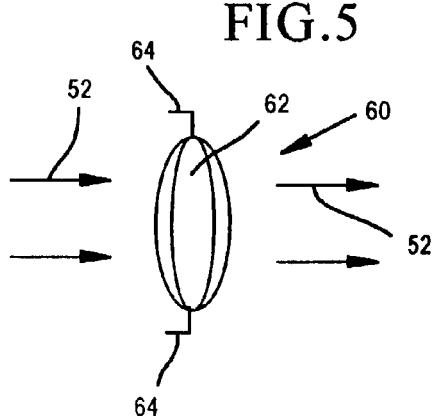
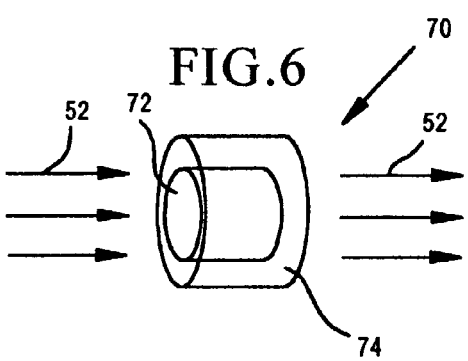
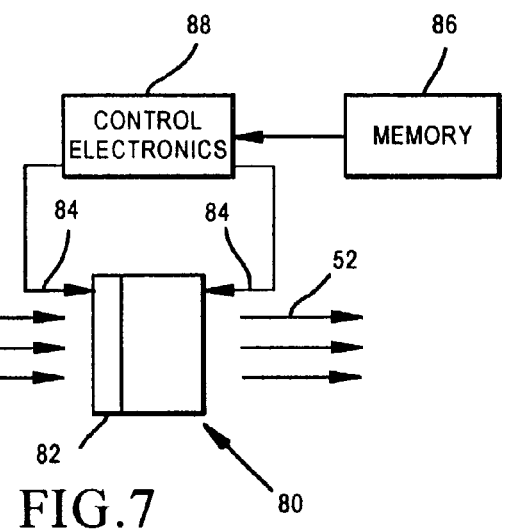
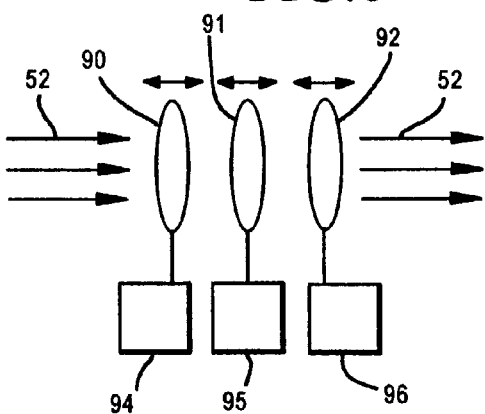
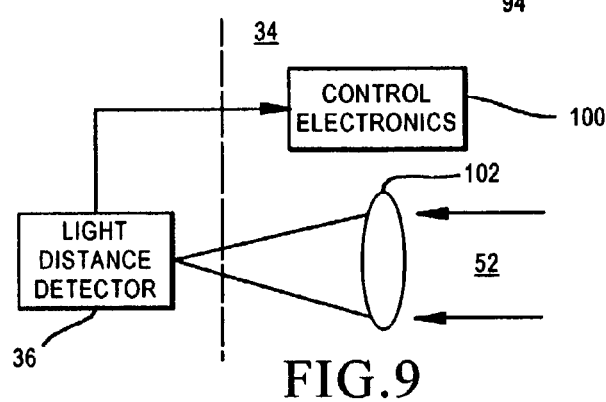

OPTICAL SCANNING SYSTEM WITH VARIABLE FOCUS LENS

CROSS REFERENCE TO RELATED APPLICATIONS

This is a continuation of U.S. patent application Ser. No. 09/740,272 filed Dec. 18, 2000 now U.S. Pat. No. 6,492,962 for "Method and Apparatus for Determining Optical Distance" of Melville et al., which is a continuation of U.S. patent application Ser. No. 09/188,991 filed Nov. 9, 1998 now U.S. Pat. No. 6,191,761 for "Method and Apparatus for Determining Optical Distance," of Melville et al. The contents of such applications are incorporated herein by reference and made a part hereof.

BACKGROUND OF THE INVENTION

This invention relates to methods and apparatus for determining an optical distance, such as a distance of an object within a field of view, and more particularly to a method and apparatus for scanning distances within a field of view.

A conventional camera includes an objective lens and a light detector, such as a photographic film, CCD array or other photosensitive device or structure. Light from a viewing environment enters the camera through the objective lens and impinges on the light detector. The portion of the viewing environment for which light enters is the camera's field of view. Some cameras pass the light to a viewfinder or eyepiece allowing an operator to select a desired field of view from the background environment. To take a picture or record, the light detector captures frames of the background light from the field of view.

Often the field of view is divided into discrete picture elements or pixels. In conventional digital video cameras the light detector records data for each pixel within the field of view for a given video frame. The data includes color, intensity and the pixel coordinates (i.e., x,y coordinates).

Conventional still cameras and video cameras include optics for focusing within the field of view. Thus, an operator can select to focus on a near field object or a far field object. Some cameras even include autofocus devices which automatically adjust the focal length of the objective lens to focus within the field of view.

SUMMARY OF THE INVENTION

According to the invention, an apparent distance of one or more points within an optical field of view is determined. For example, an apparent distance is determined for each pixel, or for one or more group of pixels, within a field of view. Such distance is also referred to as a depth of view. One advantage of the invention is that pixel data for an object viewed may be recorded, input to a computer and mapped enabling display of a 3-dimensional model of the object. Another advantage is that an augmented display device or camera device can have variable accommodation.

Incoming light is scanned along a raster pattern to direct light for a select pixel onto a light distance detector. The distance is sampled for each pixel or for a group of pixels. In one embodiment a light distance detector is used. In an alternative embodiment a variable focus lens is used.

The light distance detector includes a concentric set of ring sensors. The larger the spot of light corresponding to the pixel, the more rings are impinged. For light entering from a far distance, such as from infinity to about 20 feet, the spot will be small. For light coming from closer distances the spot is larger. The diameter of the spot is proportional to the distance at which the light originated (e.g., light source or object from which light was reflected). Each ring corresponds to a distance. The number of rings impinged determines the distance for the pixel being sampled.

The variable focus lens (VFL) is included in the light path. For a given pixel to be sampled, the focal length of the VFL is varied to achieve a small spot size. The distance at which the light originated correlates to the resulting focal length of the VFL.

Although, distance is sampled for each pixel or for a group of pixels, light intensity and color also may be sampled to record a digital image of a field of view, such as for a camera implementation.

The invention will be better understood by reference to the following detailed description taken in conjunction with the accompanying drawings.

BRIEF DESCRIPTION OF THE DRAWINGS

FIG. 5 is a diagram of an electro-mechanically variable focus lens for a lensing system of FIG. 2 according to an embodiment of this invention;

FIG. 6 is a diagram of an alternative variable focus lens embodiment for the lensing system of FIG. 2;

FIG. 7 is a diagram of another alternative variable focus lens embodiment for the lensing system of FIG. 2;

FIG. 8 is a diagram of a plurality of cascaded lens for the lensing system of FIG. 2 according to an embodiment of this invention;

FIG. 9 is a block diagram of a feedback control scheme for detecting light distance according to an embodiment of this invention.

DESCRIPTION OF SPECIFIC EMBODIMENTS

Overview

Figure 1:
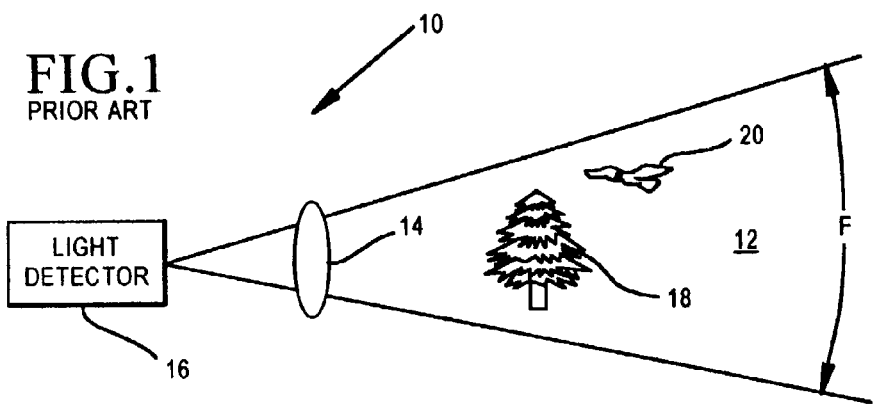
FIG. 1 is a diagram of a conventional image detection apparatus.

Referring to FIG. 1, in a conventional image detection apparatus 10, background light from a field of view F impinges on an objective lens 14 which converges the light toward a light detector 16. In a digital camera the light detector 16 may be a charge-coupled device (CCD), which also serves as a viewfinder. Light from objects within the field of view F, such as a first object 18 (e.g., a tree) and a second object 20 (e.g., a bird) is captured to record an image of the field of view or a part thereof.

Figure 2:
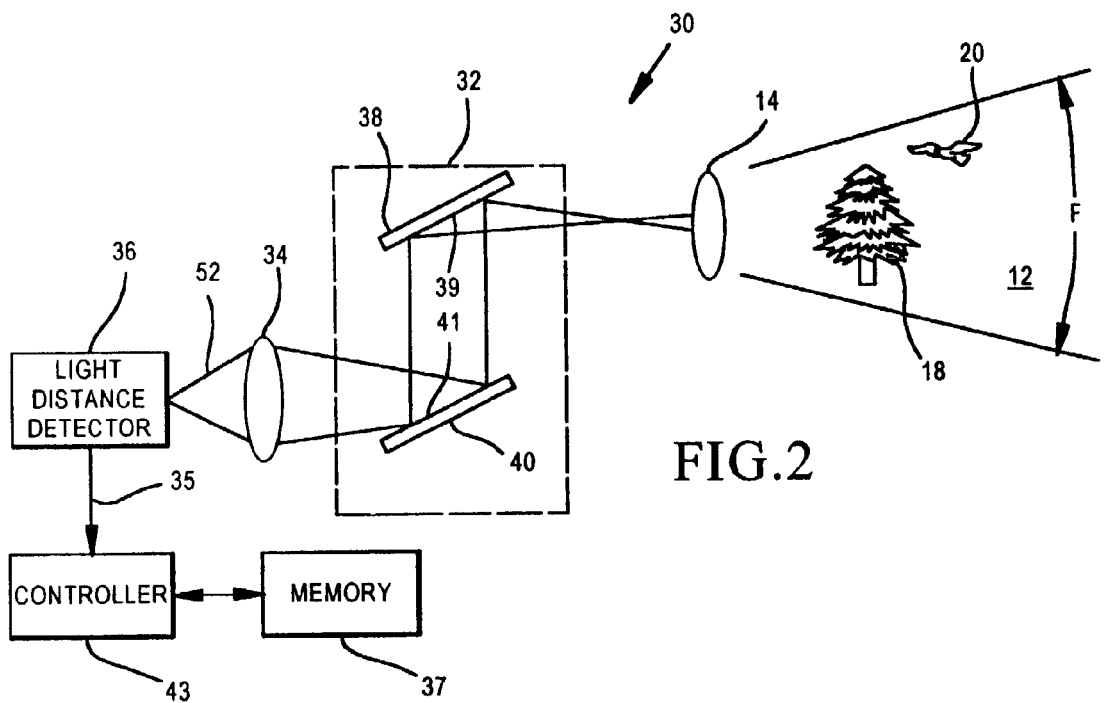
FIG. 2 is a diagram of an apparatus for scanning optical distance within a field of view according to an embodiment of this invention.

Referring to FIG. 2, an apparatus 30 detects optical distance (i.e., depth of view) for objects 18, 20 in the field of view F according to an embodiment of this invention. The apparatus 30 includes an objective lens 14, a scanning system 32, a lensing system 34 and a light distance detector 36. Background light 12, from the field of view F, including light reflected from the objects 18, 20 enters the apparatus 30 at the objective lens 14. The light is directed to the scanning system which scans the background light along two axes to select at any given time a pixel area of the field of view to be analyzed. Light originating within the select pixel area is directed into the lensing system 34 which converges the light onto the light distance detector 36. Preferably only light originating from a single, select pixel area is focused onto the light distance detector 36. In alternative embodiment the size of the area being measured for distance may vary to include multiple pixels. The size of the field portion measured for distance is determined by the size of a mirror surface on scanners 38, 40 within the scanner system 32, the relative location of the mirror surface relative to the objective lens 14 and the lensing system 34, and the relative location of the lensing system 34 relative to the light distance detector 36.

During operation, the scanning system 32 periodically scans along a prescribed scanning pattern, such as a raster pattern. For scanning a two dimensional raster pattern, a horizontal scanner 38 scans along a horizontal axis and a vertical scanner 40 scans along a vertical axis. A sample is taken at the light distance detector for multiple points along each given horizontal scanning line. Such sample, for example, corresponds to a pixel. The light distance detector signal 35 corresponds to the depth of view of the light sample. In some embodiments a table of correlation data is stored in memory 37. A controller 43 compares the light distance detector signal 35 to entries in the table to derive the depth of view for the light sample. The determined depth of view is read from the memory 37 and stored as the depth of view for the pixel that was sampled. Thus, a distance (i.e., depth of view) is determined for each pixel within the field of view.

In some embodiments the distance is stored in memory together with the pixel coordinates (i.e., field of view coordinates) for later retrieval. Light intensity and color also may be detected and stored, as for a camera or other recording implementation.

Light Distance Detector

Figure 3:
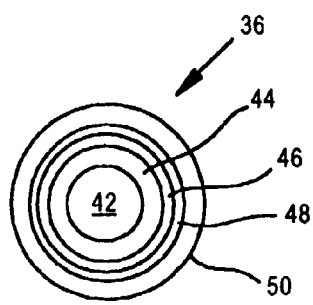
FIG. 3 is a diagram of the light detector of FIG. 2.
Figure 4:
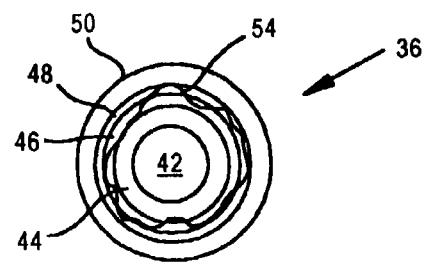
FIG. 4 is a diagram of the light detector of FIG. 3 with an impinging spot of light.

Referring to FIG. 3, a light distance detector 36 according to one embodiment of this invention includes concentrically positioned light detection sensors 42–50 that form a set of concentric rings. The number of rings and radial increment may vary depending on the distance resolution desired. Light 52 from select pixel region is converged by the lensing system 34 onto the light distance detector 36. Referring to FIG. 4, such light 52 forms a spot 54, preferably centered at the center of the detector 36. The smaller the spot 54, the farther the focal source of the light 52 for the select pixel. For light, at approximately 20 feet or further from the system 30, the light waves are flat and focus down to a common point size. Accordingly, light at such distance is not differentiated (i.e., resolved). Light from zero feet to approximately 20 feet from the system 30, however is differentiated by identifying which ring sensors detect light. In the example illustrated in FIG. 4, the light spot 54 encompasses sensors 42–48. A specific distance corresponds to activation of such sensors 42–48.

An alternative method for detecting the optical distance for pixel light is achieved, by modifying the focal length of the lensing system 34 until a spot of a desired standard size is achieved. For example, the focal length may be varied until the spot size encompasses only sensors 42 and 44. Alternatively, only sensor 42 may define the standard spot size or only sensors 42–46, or some other prescribed subset of sensors 42–50 may define the prescribed spot size. Following is a description of a lensing system which can vary its focal distance.

Lensing System with Variable Focal Length

To vary the focal length, the lensing system 14 includes a variable focus lens (VFL). In some embodiments the VFL has its focus varied by controlling the shape or thickness of the lens. In other embodiment the VFL has its focus varied by varying the index of refraction of the lens. FIG. 5 shows an electro-mechanically variable focus lens (VFL) 60 which changes its shape. A central portion 62 of the VFL 60 is constructed of a piezoelectric resonant crystalline quartz. In operation, a pair of transparent conductive electrodes 64 provide an electrical field that deforms the piezoelectric material in a known manner. Such deformation changes the thickness of the central portion 62 along its optical axis to effectively change the focus of the VFL 60. Because the VFL 60 is a resonant device, its focal length varies periodically in a very predictable pattern. By controlling the time when a light pulse enters the resonant lens, the effective focal position of the VFL 60 can be controlled.

In some applications, it may be undesirable to selectively delay pulses of light according to the resonant frequency of the VFL 60. In such cases, the VFL 60 is designed to be nonresonant at the frequencies of interest, yet fast enough to focus for each image pixel.

In an alternative embodiment, the variable focus lens is formed from a material that changes its index of refraction in response to an electric field or other input. For example, the lens material may be an electrooptic or acoustooptic material. In the preferred embodiment, the central portion 62 (see FIG. 11) is formed from lithium niobate, which is both electrooptic and acoustooptic. The central portion 62 thus exhibits an index of refraction that depends upon an applied electric field or acoustic energy. In operation, the electrodes 64 apply an electric field to control the index of refraction of the lithium niobate central portion 62. In another embodiment a quartz lens includes a transparent indium tin oxide coating that forms the electrode 64.

In another embodiment shown in FIG. 6, a lens 70 includes a compressible cylindrical center 72 having a gradient index of refraction as a function of its radius. A cylindrical piezoelectric transducer 74 forms an outer shell that surrounds the cylindrical center 72. When an electric field is applied to the transducer 74, the transducer 74 compresses the center 72. This compression deforms the center 72, thereby changing the gradient of the index of refraction. The changed gradient index changes the focal length of the center 72.

In another embodiment shown in FIG. 7 the variable focus element is a semiconductor device 80 that has an index of refraction that depends upon the free carrier concentration in a transmissive region 82. Applying either a forward or reverse voltage to the device 80 through a pair of electrodes 84 produces either a current that increases the free-carrier concentration or a reverse bias that depletes the free carrier concentration. Since the index of refraction depends upon the free carrier concentration, the applied voltage can control the index of refraction. Memory 86 and control electronics 88 may be used to control the index of refraction.

In still another embodiment shown in FIG. 8 a plurality of lenses 90–92 are cascaded in series. One or more piezoelectric positioners 94–96 move one or more of the respective lenses 90–92 along the light path changing the focal distance of the light beam. By changing the relative position of the lenses to each other the curvature of the light varies.

According to one control approach, the lensing system 34 continuously varies its focal length as needed to maintain a constant spot size. Referring to FIG. 9 the light distance detector 36 and lensing system 14 are coupled in a feedback loop. The output of the light distance detector 36 is fed to focal control electronics 100. The focal control electronics 100 vary the focal length of a VFL 102 to maintain a constant spot size (e.g., the prescribed standard spot size previously described). The focal length at any given sample time correlates to the light distance (i.e., depth of view) for such sample.

According to another control approach, the lensing system performs a sweep of the focal length range of the VFL during each light sample to be measured. During the sweep the spot 54 (see FIG. 4) will achieve its smallest size. The focal length at such time is used to define the light distance.

According to these control techniques, the precise light distance for any given sample is determined from the focal length of the lensing system 14 at the time such sample is taken. One of ordinary skill in the art will appreciate that a specific distance can be derived from the focal length using the various optical parameters (e.g., magnification factors, relative positions of components) of a system 30 embodiment.

Scanning System

In one embodiment, the scanning system 32 includes a resonant scanner for performing horizontal scanning and a galvanometer for performing vertical scanning. The scanner serving as the horizontal scanner receives a drive signal having a horizontal scanning frequency. Similarly, the galvanometer serving as the vertical scanner receives a drive signal having a vertical scanning frequency. Preferably, the horizontal scanner has a resonant frequency corresponding to the horizontal scanning frequency. In other embodiments the vertical scanner also is a resonant scanner.

One embodiment of a resonant scanner is described in related U.S. patent application Ser. No. 09/188,993 filed Nov. 9, 1998 of Michael Tidwell et al. for Scanned Beam Display With Adjustable Accommodation. The content of that application is incorporated herein by reference and made a part hereof. The resonant scanner includes a mirror driven by a drive circuit (e.g., electromagnetic drive circuit or piezoelectric actuator) to oscillate at a high frequency about an axis of rotation. The drive circuit moves the mirror responsive to a drive signal which defines the frequency of motion.

Referring to FIG. 2, background light 12 impinges on the mirror 39 of one scanner 38, then is reflected to another scanner 40, where its mirror 41 deflects the light toward the lensing system 34. As the scanner mirrors 39, 41 move, different portions (e.g., pixel areas) of the background field of view are directed toward the lensing system 34 and light distance detector 36.

In alternative embodiments, the scanning system 32 instead includes acousto-optical deflectors, electro-optical deflectors, or rotating polygons to perform the horizontal and vertical light deflection. In some embodiments, two of the same type of scanning device are used. In other embodiments different types of scanning devices are used for the horizontal scanner and the vertical scanner.

Image Capturing System

Figure 10:
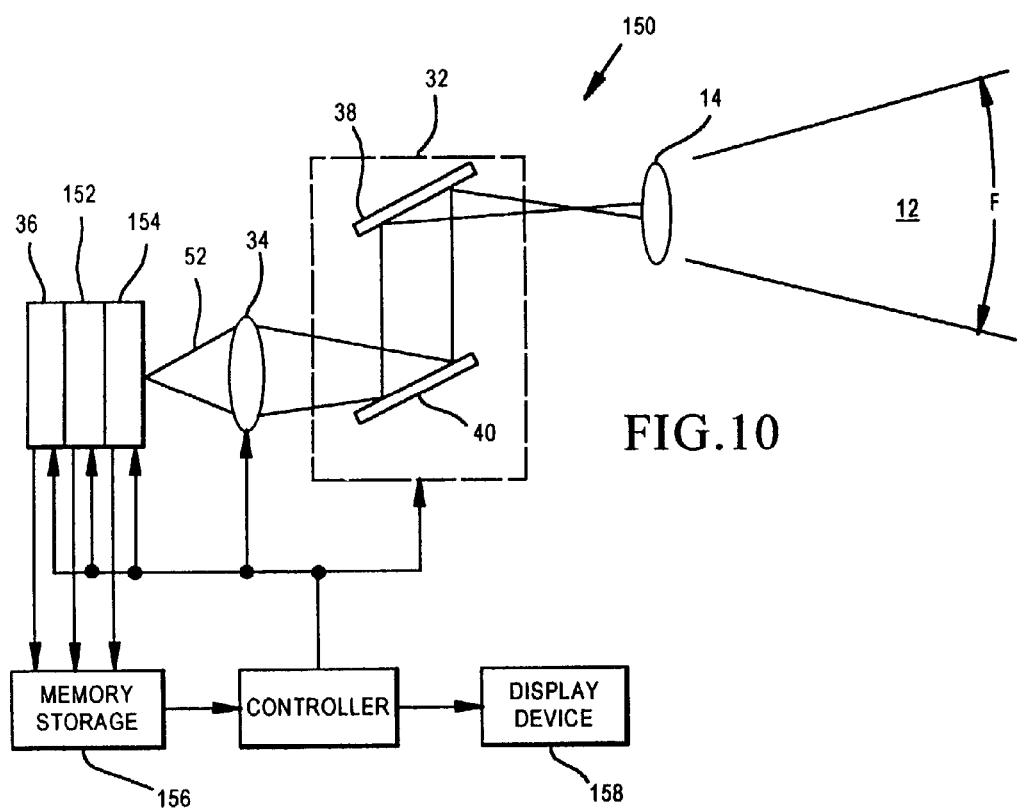
FIG. 10 is a diagram of an image recording apparatus according to an embodiment of this invention.

Referring to FIG. 10, an image capturing system 150 is shown in which image data is obtained and stored for each pixel within the field of view F for a single still frame or for multiple video image frames. The system 150 operates in the same manner as described for the system 30 of FIG. 2 and like parts performing like functions are given the same part numbers. In addition to detecting light distance however, light intensity and light color also is detected for each pixel within the field of view. Accordingly, a light intensity sensor 152 is included along with color sensor 154. One of ordinary skill in the art will appreciate that the sensors 152, 154 and 36 may be combined into a common device, or that the color sensing and intensity sensing can be achieved with a common device. Further, rather than color detection gray scales may be detected for black and white monochromatic viewing.

For each pixel in the field of view, image data is obtained and stored in memory storage 156. The image data includes the pixel coordinates, the determined light distance, the light intensity and the light color. Such image data may be recalled and displayed at display device 158 to replay the captured image frame(s). A controller 160 coordinates the field of view scanning and the image replay.

Although preferred embodiments of the invention have been illustrated and described, various alternatives, modifications and equivalents may be used. Therefore, the foregoing description should not be taken as limiting the scope of the inventions which are defined by the appended claims.

What is claimed is:

1. A variable focus lens apparatus in an optical system which scans an image as a plurality of scanned pixels, the apparatus comprising:

a lens with an alterable physical attribute; and means for dynamically altering said physical attribute periodically at a pixel scanning rate to set the physical attribute successively for each respective pixel of the plurality of scanned pixels, wherein for each pixel of the plurality of scanned pixels there is a corresponding physical attribute setting, said each pixel and the corresponding physical attribute allowing said each pixel of the plurality of scanned pixels to be captured in focus;

in which the physical attribute includes index of refraction, said lens comprising an acoustooptic material, said altering means comprising means for applying acoustic energy to the acoustooptic material, the acoustooptic material responding to the acoustic energy by altering the index of refraction of the lens to achieve a variation in focus of the lens.

2. A variable focus lens apparatus in an optical system which scans an image as a plurality of scanned pixels, the apparatus comprising:

a lens with an alterable physical attribute; and means for dynamically altering said physical attribute periodically at a pixel scanning rate to set the physical attribute successively for each respective pixel of the plurality of scanned pixels, wherein for each pixel of the plurality of scanned pixels there is a corresponding physical attribute setting, said each pixel and the corresponding physical attribute allowing said each pixel of the plurality of scanned pixels to be captured in focus;

in which the physical attribute includes index of refraction, said lens comprising a compressible cylindrical center portion, the center portion having an index of refraction which varies as a function of radius of the center portion; said altering means comprising a piezoelectric material outside the center portion which compresses the center portion in response to an electrical field to change the index of refraction of the center portion.

3. A variable focus lens apparatus in an optical system which scans an image as a plurality of scanned pixels, the apparatus comprising:

a lens with an alterable physical attribute; and means for dynamically altering said physical attribute periodically at a pixel scanning rate to control focus of the lens successively for each respective pixel of the plurality of scanned pixels, wherein for each pixel of the plurality of scanned pixels there is a corresponding physical attribute setting;

in which the physical attribute includes index of refraction, said lens comprising a semiconductor material having a transmissive region that has an index of refraction dependent upon a free carrier concentration in the transmissive region, said altering means comprising means for applying a bias voltage to the semiconductor material to alter the free carrier concentration.

* * * * *